US009817426B2

(12) United States Patent
Chellappa

(10) Patent No.: US 9,817,426 B2
(45) Date of Patent: Nov. 14, 2017

(54) LOW QUIESCENT CURRENT VOLTAGE REGULATOR WITH HIGH LOAD-CURRENT CAPABILITY

(71) Applicant: NXP B.V., Eindhoven (NL)

(72) Inventor: Ananthasayanam Chellappa, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 64 days.

(21) Appl. No.: 14/533,555

(22) Filed: Nov. 5, 2014

(65) Prior Publication Data

US 2016/0124454 A1 May 5, 2016

(51) Int. Cl.

| | |
|---|---|
| ***H02M 3/26*** | (2006.01) |
| ***G05F 3/26*** | (2006.01) |
| ***G05F 1/56*** | (2006.01) |
| ***G05F 3/24*** | (2006.01) |

(52) U.S. Cl.

CPC ................ *G05F 3/262* (2013.01); *G05F 1/56* (2013.01); *G05F 3/242* (2013.01); *G05F 3/26* (2013.01)

(58) Field of Classification Search

CPC ........... H02M 3/26; H02M 3/262; G05F 3/26; G05F 3/262

See application file for complete search history.

(56) References Cited

U.S. PATENT DOCUMENTS 4,929,884 A * 5/1990 Bird .......................... G05F 3/24 257/E27.064
5,180,927 A 1/1993 Poletto
5,180,967 A 1/1993 Yamazaki
5,640,122 A * 6/1997 McClure ................. G05F 3/205 327/530
5,986,507 A * 11/1999 Itakura .................... H03F 3/345 330/288
6,191,646 B1 * 2/2001 Shin ........................ G05F 3/267 323/315
6,359,427 B1 * 3/2002 Edwards ................. G05F 1/575 323/316
6,586,919 B2 7/2003 Viehmann
2004/0041622 A1 3/2004 Wu (Continued)

FOREIGN PATENT DOCUMENTS

| | | | |
|---|---|---|---|
| CN | 1152671 | A | 6/1997 |
| CN | 200997085 | Y | 12/2007 |
| CN | 102455731 | A | 5/2012 |
| CN | 104102266 | A | 10/2014 |
| EP | 0 766 003 | A2 | 4/1997 |
| EP | 1126350 | A1 | 8/2001 |

OTHER PUBLICATIONS

Texas Instruments; ""500nA IQ, 150mA, Ultra-Low Quiescent CurrentLow-Dropout Linear Regulator""; TPS783xx, SBVS133; Feb. 2010.

(Continued)

*Primary Examiner* — Timothy J Dole
*Assistant Examiner* — Ishrat Jamali

(57) ABSTRACT

Embodiments of voltage regulators and methods for operating a voltage regulator are described. In one embodiment, a voltage regulator includes a set of current mirror circuits configured to convert an input voltage into an output voltage and a voltage buffer circuit configured to buffer a reference voltage for the set of current mirror circuits. The set of current mirror circuits form a positive feedback loop. Other embodiments are also described.

20 Claims, 3 Drawing Sheets

(56) References Cited

U.S. PATENT DOCUMENTS

| | | | | |
|---|---|---|---|---|
| 2004/0164790 | A1* | 8/2004 | Moon | G05F 3/262 327/546 |
| 2005/0237104 | A1 | 10/2005 | Chou | |
| 2010/0283448 | A1* | 11/2010 | Lu | G05F 3/30 323/315 |
| 2012/0025883 | A1* | 2/2012 | Lin | H03L 7/095 327/158 |
| 2012/0139637 | A1* | 6/2012 | Kim | H03F 1/301 330/288 |
| 2015/0002110 | A1* | 1/2015 | Singh | G05F 1/56 323/265 |

OTHER PUBLICATIONS

ON Semiconductor; "200 mA, Ultra-Low Quiescent Current, Ultra-Low Noise, LDO Linear Voltage Regulator"; NCP702; Semiconductor Components Industries, LLC, 2013; 20 pgs.; Revision; Jul. 2013.

Texas Instruments; "LM1086 1.5A Low Dropout Positive Regulators; LM1086; 24 pgs.; SNVS039H—Jun. 2000; Revised May 2013".

Linear Technology; "Monolithic 3A, 1.25MHz Step-Down Switching Regulator"; LT0608 Rev. D; 20 pgs.; 2001.

Texas Instruments; "SM74501 Ultra-Low Quiescent Current LDO Voltage Regulator"; SNVS721B—Jun. 2011; 10 pgs.; Revised Apr. 2013.

Stlife.augmented; "150 mA, ultra low quiescent current linear voltage regulator"; Datasheet—production data; STLQ015; DocID17285 Rev 4 1; 16 pgs.; Feb. 2014.

Extended European Search Report for Patent Appln. No. 15187595.2 (dated Mar. 8, 2016).

Office Action from counterpart application CN201510726136.5; 9 pages (dated Sep. 1, 2016).

* cited by examiner

LOW QUIESCENT CURRENT VOLTAGE REGULATOR WITH HIGH LOAD-CURRENT CAPABILITY

A voltage regulator converts an input voltage into an output voltage and can be used to provide a stable operating voltage to components of an integrated circuit (IC). For example, some integrated circuits use a low-dropout (LDO) regulator to convert a 3.3 volt (V) voltage rail into a 1.8V voltage rail for digital logic cells. Because an LDO regulator is a feedback voltage regulator, the output voltage of the LDO regulator is well-regulated. However, to make an LDO regulator stable across a range of output capacitances and load-currents, the quiescent/standby current of the LDO regulator, which is the current drawn internally within the LDO regulator, is on the order of tens of microamperes. However, a large quiescent current results in high power consumption during operation in a standby mode.

Embodiments of voltage regulators and methods for operating a voltage regulator are described. In one embodiment, a voltage regulator includes a set of current mirror circuits configured to convert an input voltage into an output voltage and a voltage buffer circuit configured to buffer a reference voltage for the set of current mirror circuits. The set of current mirror circuits form a positive feedback loop. Compared to a conventional voltage regulator such as an LDO regulator, the voltage regulator uses the positive feedback loop that is formed by the current mirror circuits for voltage conversion. Consequently, compared to a conventional voltage regulator, the voltage regulator can have a low quiescent or standby current and low power consumption during operation in a standby mode. Other embodiments are also described.

In one embodiment, a voltage regulator includes a set of current mirror circuits configured to convert an input voltage into an output voltage and a voltage buffer circuit configured to buffer a reference voltage for the set of current mirror circuits. The set of current mirror circuits form a positive feedback loop.

In one embodiment, a voltage regulator includes a set of current mirror circuits configured to convert an input direct current (DC) voltage into an output DC voltage and a voltage buffer circuit configured to buffer a reference DC voltage for the set of current mirror circuits. The set of current mirror circuits form a positive feedback loop having a loop gain that is less than 1, and the output voltage is lower than the input voltage.

In one embodiment, a method for operating a voltage regulator involves buffering a reference voltage for a set of current mirror circuits and converting an input voltage into an output voltage using the set of current mirror circuits. The set of current mirror circuits form a positive feedback loop.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
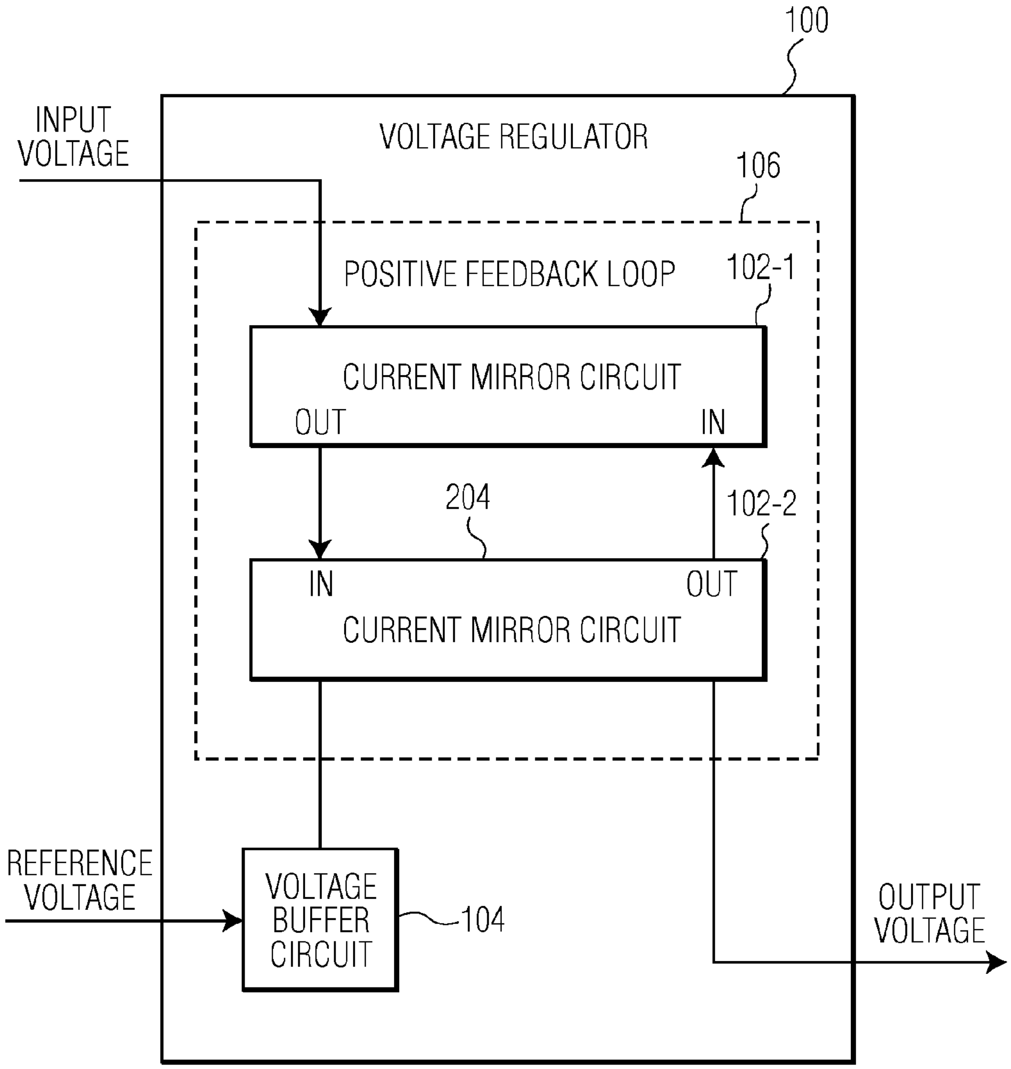
FIG. 1 is a schematic block diagram of a voltage regulator in accordance with an embodiment of the invention.

FIG. 1 is a schematic block diagram of a voltage regulator 100 in accordance with an embodiment of the invention. In the embodiment depicted in FIG. 1, the voltage regulator 100 includes two current mirror circuits 102-1, 102-2 and a voltage buffer circuit 104. The voltage regulator converts an input voltage into an output voltage. The input and output voltages can be any suitable type of voltages. In some embodiments, the input and output voltages are direct current (DC) voltages. The voltage regulator can be used to provide an operating voltage for components of an IC. In some embodiments, the voltage regulator converts an input voltage of around (e.g., ±30%) 3.3 Volts (V) into an output voltage of around (e.g., ±30%) 1.8V, and in other embodiments, the voltage regulator converts an input voltage of around 5V into an output voltage of around 1.5V. However, the input and output voltages of the voltage regulator are not limited by the example voltages. Although the voltage regulator is shown in FIG. 1 as including certain components, in some embodiments, the voltage regulator includes less or more components to implement less or more functionalities. For example, in some embodiments, the voltage regulator includes a startup circuit used to generate a startup current.

The current mirror circuits 102-1, 102-2 of the voltage regulator 100 are configured to convert an input voltage into an output voltage. The output voltage of the voltage regulator may be lower than the reference voltage of the voltage regulator or higher than the reference voltage of the voltage regulator. In the embodiment depicted in FIG. 1, the current mirror circuits form the positive feedback loop 106. As shown in FIG. 1, an input terminal, "IN," of the current mirror circuit 102-1 is connected to an output terminal, "OUT," of the current mirror circuit 102-2 and an output terminal, "OUT," of the current mirror circuit 102-1 is connected to an input terminal, "IN," of the current mirror circuit 102-2. A positive feedback loop is a feedback loop having a positive loop gain. In a positive feedback loop, the feedback is in phase with the input of the feedback loop such that an increase at the input causes a change in the feedback, which in turn causes a larger increase at the input. Because the current mirror circuits form the positive feedback loop, the voltage regulator can be started from a low-power standby mode based on a small quiescent or standby current. The quiescent current in the voltage regulator is the current drawn internally within the voltage regulator. In some embodiments, the quiescent current in the voltage regulator is measured as the input current while no load is connected to the voltage regulator. In some embodiments, the positive feedback loop 106 has a loop gain that is greater than zero but less than 1. Generally, if the loop gain of a feedback loop is greater than 1, the feedback loop can have exponential growth, which causes the feedback loop to be unstable.

The voltage buffer circuit 104 of the voltage regulator 100 is configured to buffer a reference voltage for the current mirror circuits 102-1, 102-2. The reference voltage is generally lower than the input voltage of the voltage regulator. For example, the reference voltage can be about (e.g., ±30%) half of the input voltage of the voltage regulator. In some embodiments, the voltage buffer circuit is used to transfer a voltage from a first circuit (e.g., a reference generation circuit that generates the reference voltage), having a high output impedance, to a second circuit (e.g., the current mirror circuit 102-2) with a low input impedance. The voltage buffer circuit can prevent a circuit at its input from interfering with the desired operation of a circuit at its output. In some embodiments, the voltage buffer circuit includes a source follower circuit.

ICs generally use a voltage regulator circuit that achieves good output voltage regulation in the presence of large load-current variation. Typically, a low-dropout (LDO) regulator is used in an IC to convert an input voltage into a suitable operating voltage for IC components. However, because a LDO regulator has a feedback loop that needs to be stable within the range of load currents and bypass-capacitor values, a certain minimum quiescent current is needed to ensure that the unity gain frequency (UGF) of the LDO regulator is above a certain threshold or to ensure that non-dominant pole-frequencies of the LDO regulator are in an acceptable range. Compared to a conventional voltage regulator, such as an WO regulator, the voltage regulator 100 depicted in FIG. 1 uses the positive feedback loop 106 that is formed by the current mirror circuits 102-1, 102-2 for voltage conversion. Because the current mirror circuits, which form the positive feedback loop, can be simply implemented, the voltage regulator can be implemented using a simplified circuit structure. Consequently, compared to a conventional voltage regulator, the voltage regulator can have a low quiescent or standby current. For example, the voltage regulator can have a quiescent current that is equal to or below 1 microampere (μA). The positive feedback loop formed by the current mirror circuits in general is stable when the loop gain is less than 1. Consequently, the output voltage of the voltage regulator can be reasonably well-regulated.

Figure 2:
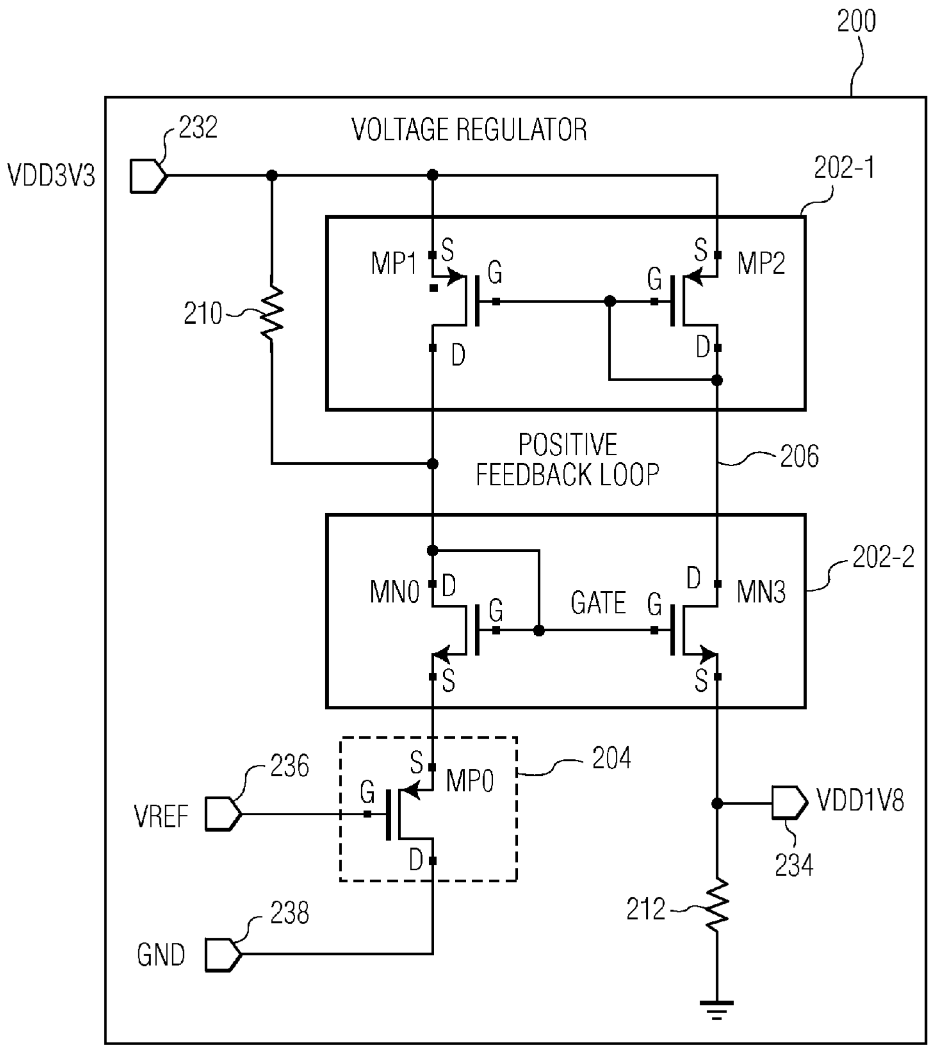
FIG. 2 depicts an embodiment of the voltage regulator depicted in FIG. 1.

FIG. 2 depicts an embodiment of the voltage regulator 100 of FIG. 1. In the embodiment depicted in FIG. 2, a DC voltage regulator 200 includes a startup circuit 210, two current mirror circuits 202-1, 202-2 that form a positive loop 206, a voltage buffer circuit 204, and a resistor 212. The voltage regulator 200 depicted in FIG. 2 is one possible embodiment of the voltage regulator 100 depicted in FIG. 1. However, the voltage regulator depicted in FIG. 1 is not limited to the embodiment shown in FIG. 2.

The voltage regulator 200 can have low standby power consumption, high load-current capability, and a reasonable output-voltage compliance range. For example, the voltage regulator can have a quiescent current on the order of 1 μA while supporting a load in the range of several hundred microamperes. Consequently, the voltage regulator can provide sufficient processing power to detect the need to exit a low-power mode and to enable a full-fledged LDO. Although in some cases the output voltage of the voltage regulator may not be well regulated (e.g., the output voltage can be low for a low load) and the voltage regulator may not be a low-dropout solution (e.g., the input voltage may be higher than 2.9V), the voltage regulator can be used to replace an LDO in a low-power-mode.

In an embodiment, the voltage regulator 200 converts an input voltage, "VDD3V3," into an output voltage, "VDD1V8." The system power supply voltage may typically be 3.3V while the operating voltage for digital logic cells is typically 1.8V. In the embodiment depicted in FIG. 2, the voltage regulator receives an input voltage of 3.3V and outputs an output voltage of 1.8V. However, in other embodiments, the input and output voltages of the voltage regulator have other values.

In an embodiment, because the voltage regulator 200 uses the positive feedback loop 206, the startup circuit 210 is used to generate an initial startup current because "no current" is also a stable state. In some embodiments, the startup circuit is implemented as a resistor 210 with large resistance (e.g., 10-20 mega Ohm). A resistor with a large resistance can help to achieve a low quiescent current. In the embodiment depicted in FIG. 2, the startup circuit is connected to an input terminal 232, from which the input voltage, "VDD3V3," is input into the voltage regulator.

The current mirror circuits 202-1, 202-2 of the voltage regulator 200 are configured to perform voltage down-conversion. The current mirror circuit 202-1 includes PMOS transistors, "MP1," "MP2" while the current mirror circuit 202-2 includes NMOS transistors, "MN0," "MN3." In the current mirror circuit 202-1, gate terminals, "G," of the PMOS transistors, "MP1," "MP2," are connected to each other and the gate terminal, "G," of the PMOS transistor, "MP2," is connected to the drain terminal, "D," of the PMOS transistor, "MP2." In the current mirror circuit 202-2, gate terminals, "G," of the NMOS transistors, "MN0," "MN3," are connected to each other and the gate terminal, "G," of the NMOS transistor, "MN0," is connected to the drain terminal, "D," of the NMOS transistor, "MN0." The current mirror circuits 202-1, 202-2 form the positive feedback loop 206 with a loop gain that is greater than zero but less than 1. Because the positive feedback loop has a loop gain that is less than 1, the voltage regulator operates as a high gain structure in closed-loop, thereby providing good load regulation. In the embodiment depicted in FIG. 2, the drain terminal, "D," of the PMOS transistor, "MP1," is connected to the drain terminal, "D," of the NMOS transistor, "MN0," while the drain terminal, "D," of the PMOS transistor, "MP3," is connected to the drain terminal, "D," of the NMOS transistor, "MN3."

The voltage buffer circuit 204 of the voltage regulator 200 is configured to buffer a reference voltage, "Vref," for the current mirror circuits 202-1, 202-2. In an embodiment, the reference voltage, "Vref," is set to be below 1.5V (e.g., 1.25V). In the embodiment depicted in FIG. 2, the voltage buffer circuit 204 is implemented as a source follower PMOS transistor, "MP0," whose output (i.e., the signal at the source terminal, "S," of the PMOS transistor, "MP0,") is connected to the positive feedback loop 206 formed by the current mirror circuits 202-1, 202-2. In some embodiments, the output voltage of the voltage regulator is approximately a PMOS voltage threshold above the reference voltage, "Vref." As shown in FIG. 2, the gate terminal, "G," of the source follower transistor, "MP0," is connected to a reference terminal 236, from which the reference voltage, "Vref," is input into the voltage regulator, the drain terminal, "D," of the source follower transistor, "MP0," is connected to a ground terminal 238, "gnd," and the source terminal, "S," of the source follower transistor, "MP0," is connected to the source terminal, "S," of the transistor, "MN0," of the current mirror circuit 202-2.

The resistor 212 of the voltage regulator 200, which may be optional in some embodiments, is used to ensure minimum current in the current mirror circuits 202-1, 202-2. In the embodiment depicted in FIG. 2, the resistor 212 is connected to the positive feedback loop 206 formed by the current mirror circuits 202-1, 202-2 and to an output terminal 234, from which the output voltage, "VDD1V8," of the voltage regulator is output. In some embodiments, the resistor has a large resistance (e.g., 10-20 mega Ohm).

An example of the operation of the voltage regulator 200 is described as follows. When a load circuit (not shown) draws current from the output terminal 234 of the voltage regulator, the source voltage of the NMOS transistor, "MN3," instantaneously reduces. The lowering of the source voltage of the NMOS transistor, "MN3," (thereby increasing its gate to source voltage (VGS)) allows the NMOS transistor, "MN3," to supply the increased load demand. The increased load current at the output terminal 234 also flows out of the current mirror circuit 202-1 formed by the PMOS transistors, "MP1," "MP2." Consequently, the increased load current (ratioed down because the transistors, "MP2," "MP3," are typically larger than the transistors, "MP1," "MN0") flows in the NMOS transistor, "MN0," which causes the VGS of the NMOS transistor, "MN0," to increase because of the increase of its drain current, and causes the source voltage of the NMOS transistor, "MN0," to increase due to the non-zero output resistance of the source-follower, "MP0." Consequently, the gate voltage of the NMOS transistor, "MN3," is increased and the source voltage of the NMOS transistor, "MN3," is restored to a value that corresponds to acceptable voltage regulation.

Figure 3:
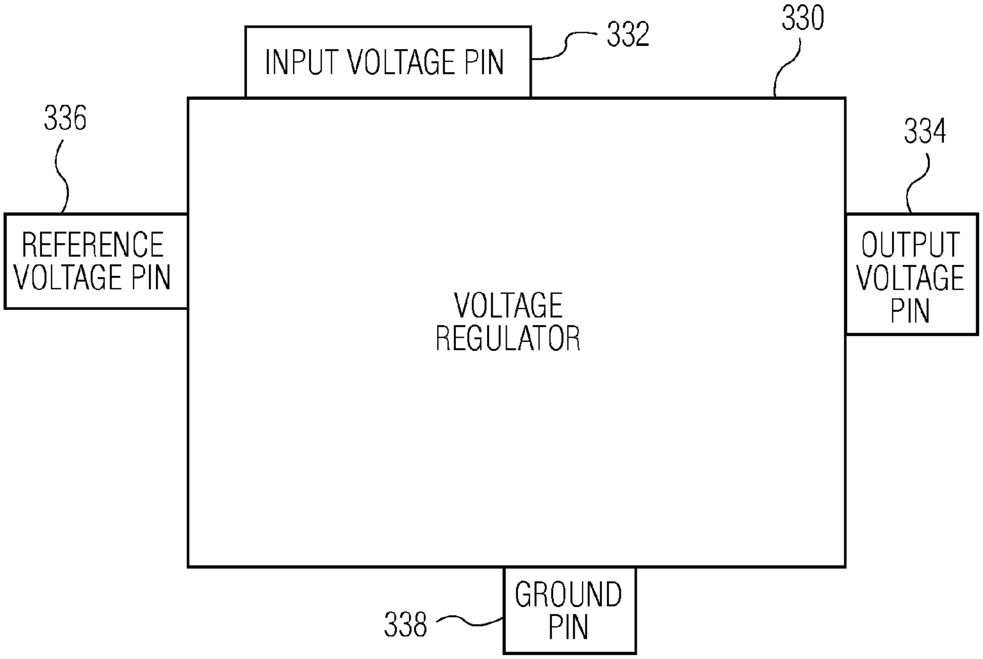
FIG. 3 depicts an embodiment of a pin configuration of a packaged IC device.

In some embodiments, the voltage regulator 200 depicted in FIG. 2 can be embodied in a packaged IC device. FIG. 3 depicts an embodiment of a packaged IC device 330. In the embodiment depicted in FIG. 3, the pin configuration of the packaged IC device includes an input voltage pin 332, an output voltage pin 334, a reference voltage pin 336, and a ground pin 335. The packaged IC device depicted in FIG. 3 is one possible packaged IC device of the voltage regulator depicted in FIG. 2. However, the packaged IC device of the voltage regulator is not limited to the embodiment shown in FIG. 3.

Figure 4:
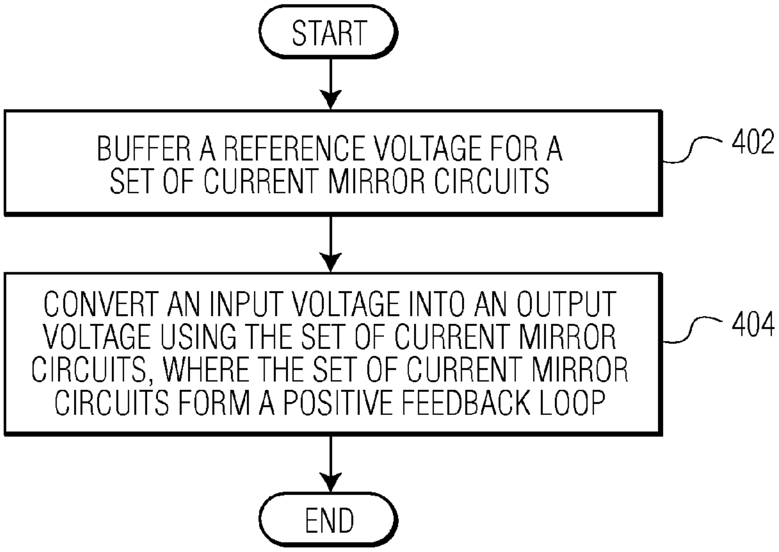
FIG. 4 is a process flow diagram of a method for operating a voltage regulator in accordance with an embodiment of the invention.

FIG. 4 is a process flow diagram of a method for operating a voltage regulator in accordance with an embodiment of the invention. The voltage regulator may be similar to or the same as the voltage regulator 100 depicted in FIG. 1 and/or the voltage regulator 200 depicted in FIG. 2. At block 402, a reference voltage is buffered for a set of current mirror circuits. At block 404, an input voltage is converted into an output voltage using the set of current mirror circuits, where the set of current mirror circuits form a positive feedback loop.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A voltage regulator, the voltage regulator comprising:
a set of current mirror circuits configured to convert an input voltage into an output voltage, wherein the set of current mirror circuits form a positive feedback loop; and
a voltage buffer circuit configured to buffer a fixed reference voltage for the set of current mirror circuits,
wherein the voltage buffer circuit comprises a source follower transistor connected between the fixed reference voltage and a source terminal of a transistor device of the set of current mirror circuits,
wherein a drain terminal of the source follower transistor is directly connected to a second fixed reference voltage;
wherein the second fixed reference voltage is zero volt, and
wherein the drain terminal of the source follower transistor is directly connected to ground.

2. The voltage regulator of claim 1, wherein the positive feedback loop has a loop gain that is less than 1.

3. The voltage regulator of claim 1, wherein the output voltage is lower than the input voltage.

4. The voltage regulator of claim 1, wherein the input and output voltages are direct current (DC) voltages.

5. The voltage regulator of claim 1,
wherein the set of current mirror circuits comprises a first current mirror circuit and a second current mirror circuit,
wherein an input terminal of the first current mirror circuit is connected to an output terminal of the second current mirror and an output terminal of the first current mirror circuit is connected to an input terminal of the second current mirror circuit.

6. The voltage regulator of claim 5,
wherein the first current mirror circuit comprises a first PMOS transistor and a second PMOS transistor, and
wherein the second current mirror circuit comprises a first NMOS transistor and a second NMOS transistor.

7. The voltage regulator of claim 5,
wherein gate terminals of the first and second PMOS transistors are connected to each other, and
wherein the gate terminal of the second PMOS transistor is connected to a drain terminal of the second PMOS transistor.

8. The voltage regulator of claim 7,
wherein gate terminals of the first and second NMOS transistors are connected to each other, and
wherein the gate terminal of the first NMOS transistor is connected to a drain terminal of the first NMOS transistor.

9. The voltage regulator of claim 8,
wherein a drain terminal of the first PMOS transistor is connected to a drain terminal of the first NMOS transistor, and
wherein the drain terminal of the second PMOS transistor is connected to the drain terminal of the second NMOS transistor.

10. The voltage regulator of claim 1, wherein the fixed reference voltage is lower than the input voltage and the output voltage.

11. The voltage regulator of claim 1, further comprising a startup circuit configured to generate a startup current for the set of current mirror circuits.

12. The voltage regulator of claim 11,
wherein the startup circuit comprises a resistor connected to an input terminal, from which the input voltage is input into the voltage regulator, and to the set of current mirror circuits.

13. The voltage regulator of claim 1, further comprising
a resistor connected to an output terminal, from which the output voltage is output from the voltage regulator, and to the set of current mirror circuits.

14. The voltage regulator of claim 1, wherein the input voltage is around 3.3V and the output voltage is around 1.8V.

15. The voltage regulator of claim 1,
wherein the source follower transistor comprises a PMOS transistor,
wherein a source terminal of the PMOS transistor is connected to the source terminal of the transistor device,
wherein a drain terminal of the PMOS transistor is connected to a fixed voltage, and
wherein a gate terminal of the PMOS transistor is connected to a reference terminal from which the fixed reference voltage is input into the voltage regulator.

16. A voltage regulator, the voltage regulator comprising:
a set of current mirror circuits configured to convert an input direct current (DC) voltage into an output DC voltage,
wherein the set of current mirror circuits form a positive feedback loop having a loop gain that is less than 1, and wherein the output voltage is lower than the input voltage; and
a voltage buffer circuit configured to buffer a fixed reference DC voltage for the set of current mirror circuits,
wherein the voltage buffer circuit comprises a source follower transistor connected between the fixed reference DC voltage and a source terminal of a transistor device of the set of current mirror circuits, and
wherein a drain terminal of the source follower transistor is directly connected to a second fixed reference voltage;
wherein the second fixed reference voltage is zero volt, and
wherein the drain terminal of the source follower transistor is directly connected to ground.

17. The voltage regulator of claim 16,
wherein the set of current mirror circuits comprises a first current mirror circuit and a second current mirror circuit,
wherein the first current mirror circuit comprises a first PMOS transistor and a second PMOS transistor,
wherein the second current mirror circuit comprises a first NMOS transistor and a second NMOS transistor,
wherein gate terminals of the first and second PMOS transistors are connected to each other,
wherein the gate terminal of the second PMOS transistor is connected to a drain terminal of the second PMOS transistor,
wherein gate terminals of the first and second NMOS transistors are connected to each other,
wherein the gate terminal of the first NMOS transistor is connected to a drain terminal of the first NMOS transistor,
wherein a drain terminal of the first PMOS transistor is connected to a drain terminal of the first NMOS transistor, and
wherein the drain terminal of the second PMOS transistor is connected to the drain terminal of the second NMOS transistor.

18. The voltage regulator of claim 17,
further comprising a startup circuit configured to generate a startup current for the set of current mirror circuits, and
wherein the startup circuit comprises a resistor connected to an input terminal, from which the input voltage is input into the voltage regulator, and to the set of current mirror circuits.

19. The voltage regulator of claim 17, wherein the input voltage is around 3.3V and the output voltage is around 1.8V.

20. A method for operating a voltage regulator, the method comprising:
buffering a fixed reference voltage for a set of current mirror circuits using a source follower transistor connected between the fixed reference voltage and a source terminal of a transistor device of the set of current mirror circuits, and
wherein a drain terminal of the source follower transistor is directly connected to a second fixed reference voltage;
wherein the second fixed reference voltage is zero volt, and
wherein the drain terminal of the source follower transistor is directly connected to ground; and
converting an input voltage into an output voltage using the set of current mirror circuits,
wherein the set of current mirror circuits form a positive feedback loop.

* * * * *